United States Patent
Lee et al.

(10) Patent No.: US 11,438,998 B2
(45) Date of Patent: Sep. 6, 2022

(54) PLASMA GENERATING APPARATUS FOR SECONDARY BATTERY AND LAMINATION SYSTEM COMPRISING THE SAME

(71) Applicant: LG Chem, Ltd., Seoul (KR)

(72) Inventors: Sang Kyun Lee, Daejeon (KR); Sang Ho Bae, Daejeon (KR); Duck Hoe Kim, Daejeon (KR); Cha Hun Ku, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 494 days.

(21) Appl. No.: 16/351,871

(22) Filed: Mar. 13, 2019

(65) Prior Publication Data
US 2019/0215944 A1    Jul. 11, 2019

Related U.S. Application Data (63) Continuation of application No. PCT/KR2018/004105, filed on Apr. 6, 2018.

(30) Foreign Application Priority Data

Jun. 23, 2017 (KR) .......................... 10-2017-0079777

(51) Int. Cl.
*H05H 1/48* (2006.01)
*B32B 37/06* (2006.01)
(Continued)

(52) U.S. Cl.
CPC .............. *H05H 1/48* (2013.01); *B29C 59/14* (2013.01); *B29C 66/028* (2013.01); *B32B 7/14* (2013.01);
(Continued)

(58) Field of Classification Search
CPC ........ H05H 1/24; H05H 1/2406; H05H 1/473; H05H 1/2431; B29C 59/14; B32B 38/0004
See application file for complete search history.

(56) References Cited

U.S. PATENT DOCUMENTS

| 8,309,033 B2 | 11/2012 | Finn et al. |
| 2003/0228416 A1* | 12/2003 | Iwamaru ................... C23C 4/18 |
| | | 427/200 |
| 2007/0163499 A1 | 7/2007 | Finn et al. |

FOREIGN PATENT DOCUMENTS

| CN | 1784519 A | 6/2006 |
| CN | 104191774 A | 12/2014 |

(Continued)

OTHER PUBLICATIONS

International Search Report for International Patent Application No. PCT/KR2018/004105, dated Aug. 14, 2018, 4 pages.

*Primary Examiner* — Stephan J Essex
(74) *Attorney, Agent, or Firm* — Birch, Stewart, Kolasch & Birch, LLP (57) ABSTRACT

The present invention relates to a plasma generating apparatus for a secondary battery. The plasma generating apparatus for the secondary battery comprises a roller part comprising a transfer roller that transfers a separator and a metal member built in the transfer roller, and a plasma generating part comprising a main body spaced apart from the transfer roller and a plurality of electrode members disposed on positions that are spaced apart from each other in a direction of both ends of the main body and partially generating a plasma between the metal member and the main body to form a patterned bonding layer on a surface of the separator, wherein the plurality of electrode members are (Continued)

detachably coupled to the main body to adjust a number of the electrode members coupled to the main body based on a size of the separator.

13 Claims, 8 Drawing Sheets

(51) Int. Cl.
| | |
|---|---|
| *B32B 37/12* | (2006.01) |
| *B32B 7/14* | (2006.01) |
| *B32B 38/00* | (2006.01) |
| *H01M 10/04* | (2006.01) |
| *B29C 65/00* | (2006.01) |
| *B32B 41/00* | (2006.01) |
| *H05H 1/24* | (2006.01) |
| *B29C 59/14* | (2006.01) |
| *H01M 50/409* | (2021.01) |
| *H01M 50/46* | (2021.01) |
| *B32B 37/04* | (2006.01) |
| *B32B 37/22* | (2006.01) |

(52) U.S. Cl.
CPC ............. *B32B 37/06* (2013.01); *B32B 37/12* (2013.01); *B32B 38/0004* (2013.01); *B32B 38/0008* (2013.01); *B32B 41/00* (2013.01); *H01M 10/04* (2013.01); *H01M 50/409* (2021.01); *H01M 50/461* (2021.01); *H05H 1/2406* (2013.01); *B32B 37/04* (2013.01); *B32B 37/22* (2013.01); *B32B 2457/10* (2013.01); *H05H 1/2431* (2021.05); *H05H 1/473* (2021.05)

(56) References Cited

FOREIGN PATENT DOCUMENTS

| | | |
|---|---|---|
| JP | H10172531 A | 6/1998 |
| JP | 2005-015841 A | 1/2005 |
| JP | 2006-079935 A | 3/2006 |
| JP | 2007-012668 A | 1/2007 |
| KR | 10-0958649 B1 | 5/2010 |
| KR | 10-2012-0111078 A | 10/2012 |
| KR | 10-2016-0028730 A | 3/2016 |
| KR | 10-2016-0121177 A | 10/2016 |
| KR | 10-2016-0126343 A | 11/2016 |

* cited by examiner

PLASMA GENERATING APPARATUS FOR SECONDARY BATTERY AND LAMINATION SYSTEM COMPRISING THE SAME

CROSS-REFERENCE TO RELATED APPLICATION

This application is a U.S. national phase application, pursuant to 35 U.S.C. § 371, of PCT/KR2018/004105 filed on Apr. 6, 2018, designating the United States, which claims the benefit of the priority of Korean Patent Application No. 10-2017-0079777 filed on Jun. 23, 2017, which applications are hereby incorporated by reference in their entirety.

TECHNICAL FIELD

The present invention relates to a plasma generating apparatus for a secondary battery and a lamination system comprising the same, and more particularly, to a plasma generating apparatus for a secondary battery, which forms a patterned bonding layer on a surface of a separator and a lamination system comprising the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch that accommodates the electrode assembly and the electrolyte. Further, in the electrode assembly, a positive electrode and a negative electrode are disposed with a separator therebetween. An electrode tab is attached to each of the positive electrode and the negative electrode, and an electrode lead is coupled to each of the electrode tabs.

A lamination process is performed on the secondary battery to improve adhesion of the electrode assembly in which the positive electrode, the separator, the negative electrode are laminated.

However, the secondary battery has a problem in which impregnation of the electrolyte is significantly reduced although the positive electrode, the separator, and the negative electrode are improved in bonding property through the lamination process. Particularly, a gas generated between the positive electrode and the separator or between the negative electrode and the separator is not smoothly discharged, and thus, it is difficult to secure the uniform quality of the electrode assembly.

DISCLOSURE OF THE INVENTION

Technical Problem

The present invention has been made to solve the above problem, and an object of the present invention is to provide a plasma generating apparatus for a secondary battery, which improves a bonding property of a positive electrode, a separator, and a negative electrode, an impregnation property of an electrolyte, and discharging characteristics of a gas during a lamination process, and a lamination system comprising the same.

Particularly, an object of the present invention is to provide a plasma generating apparatus for a secondary battery, which is capable of being applied to all separators having various sizes and a lamination system comprising the same.

Technical Solution

To achieve the above-described objects, a plasma generating apparatus for a secondary battery according to a first embodiment of the present invention comprises a roller part comprising a transfer roller that transfers a separator and a metal member built in the transfer roller, and a plasma generating part comprising a main body spaced apart from the transfer roller and a plurality of electrode members disposed on positions that are spaced apart from each other in a direction of both ends of the main body and partially generating a plasma between the metal member and the main body to form a patterned bonding layer on a surface of the separator, wherein the plurality of electrode members are detachably coupled to the main body to adjust a number of the electrode members coupled to the main body based on a size of the separator.

The main body may comprise a fixed piece spaced apart from the transfer roller and a support piece to which the fixed piece is fixed and which has a plurality of coupling holes in positions that are spaced apart from each other in the direction of the both ends of the main body, and each of the plurality of electrode members may comprise an electrode piece supported by the fixed piece and a coupling protrusion that detachably couples the electrode piece to the coupling hole.

The main body may comprise a fixed piece spaced apart from the transfer roller and a support piece to which the fixed piece is fixed and which has a coupling hole that is formed lengthwise in the direction of the both ends of the main body, and each of the plurality of electrode members may comprise an electrode piece supported by the fixed piece and a coupling protrusion that detachably couples the electrode piece to the coupling hole and simultaneously allows the electrode piece to be moved within the coupling hole in the direction of the both ends of the main body.

The plurality of electrode members may be disposed at a same interval or different intervals in a width direction of the separator on the main body.

The plurality of electrode members may have same length, width, and thickness.

One or more of lengths, widths, and thicknesses of the plurality of electrode members may be different from each other.

The plasma generating apparatus may further comprise a moving part that moves the plasma generating part in a direction that is directed toward the transfer roller or moving the plasma generating part in a direction opposite to the direction that is directed toward the transfer roller.

The main body may be made of a nonmetallic material. Particularly, the main body may be made of a ceramic.

The plurality of electrode members may be provided as corona discharge electrodes.

The plasma generating part may be disposed on each of both surfaces of the separator to form a patterned bonding layer on each of the both surfaces of the separator.

The plasma generating part may form patterned bonding layers having different bonding forces on the both surfaces of the separator.

A lamination system for a secondary battery according to the first embodiment of the present invention comprises a plurality of supply rollers that supplies an electrode and a separator so that the electrode and the separator are alternately laminated, a first cutter that cuts the electrode, the plasma generating apparatus that forms a patterned bonding layer on a surface of the separator, a laminator that thermally fuses the electrode and the separator to manufacture a radical unit, and a second cutter that cuts the radical unit to a uniform size, wherein the plasma generating apparatus partially generates a plasma on the surface of the separator before the separator and the electrode are thermally fused to form the patterned bonding layer.

Advantageous Effects

The present invention according to the foregoing embodiments has effects as follows.

First, the plasma generating apparatus for the secondary battery according to the present invention may comprise the plasma generating part comprising a plurality of electrode members. The plurality of electrode members may be detachably coupled to the main body. Thus, the number of the electrode members coupled to the main body may be easily adjusted based on the size of the separator due to the above-described characteristics. As a result, the plasma generating apparatus may be compatibly used for the separators having various sizes, and also, the patterned bonding layer formed on the separator may be readily adjusted in position.

Second, according to the first embodiment, the main body of the plasma generating part of the present invention may comprise a fixed piece and a support piece having the coupling hole, and the electrode member may comprise the electrode piece and the coupling protrusion. Thus, the electrode member may be easily coupled to or separated from the main body due to the above-described characteristics. As a result, convenience of usage may be improved. Particularly, the coupling hole may be formed to be opened in the direction that is directed toward the coupling protrusion. Thus, ease and convenience of the coupling between the coupling protrusion and the coupling hole may be improved.

Third, according to the second embodiment, the main body of the plasma generating part of the present invention may comprise the fixed piece and the support piece having the coupling hole that is formed lengthwise. The electrode member may comprise the electrode piece and the coupling protrusion. Thus, the electrode member may be detachably coupled to the coupling hole that is formed lengthwise and also moved within the coupling hole due to the above-described characteristics. As a result, the electrode member may be more simply adjusted in position based on the size of the separator. Particularly, since the distance between the electrode members is adjustable, the patterned bonding layer formed on the separator may be narrowed or widened in width.

Fourth, in the plasma generating part of the present invention, the plurality of electrode members may be provided at a same interval or different intervals. Thus, the bonding layer having the various patterns may be implemented due to the above-described characteristics.

Fifth, in the plasma generating part of the present invention, the plurality of electrode members may have same length, width, and thickness. Thus, the patterned bonding layers having the same size may be formed on the surface of the separator due to the above-described characteristics. As a result, the entire surface of the separator may have a uniform bonding layer.

Sixth, in the plasma generating part of the present invention, the plurality of electrode members may have different lengths, widths, and thicknesses. Thus, the patterned bonding layer having the various patterns may be formed on the surface of the separator due to the above-described characteristics.

Seventh, in the plasma generating part of the present invention, the main body may be made of a ceramic that is a nonmetallic material. Thus, occurrence of resistance may be prevented due to the above-described characteristics. As a result, the plasma may be stably generated between the metal member and the main body.

Eighth, the plasma generating apparatus of the present invention may comprise a moving part that moves the plasma generating part in the direction that is directed toward the transfer roller or the direction opposite to the transfer roller. Thus, the distance between the transfer roller and the plasma generating part may be easily adjusted due to the above-described characteristics. As a result, the plasma may be stably generated between the metal member and the main body.

Ninth, the lamination system for the secondary battery of the present invention may comprise the plasma generating apparatus that forms the patterned bonding layer. Thus, the electrode assembly having a uniform quality may be manufactured due to the above-described characteristics.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

First Embodiment of the Present Invention

Structure of Radical Unit

Figure 1:
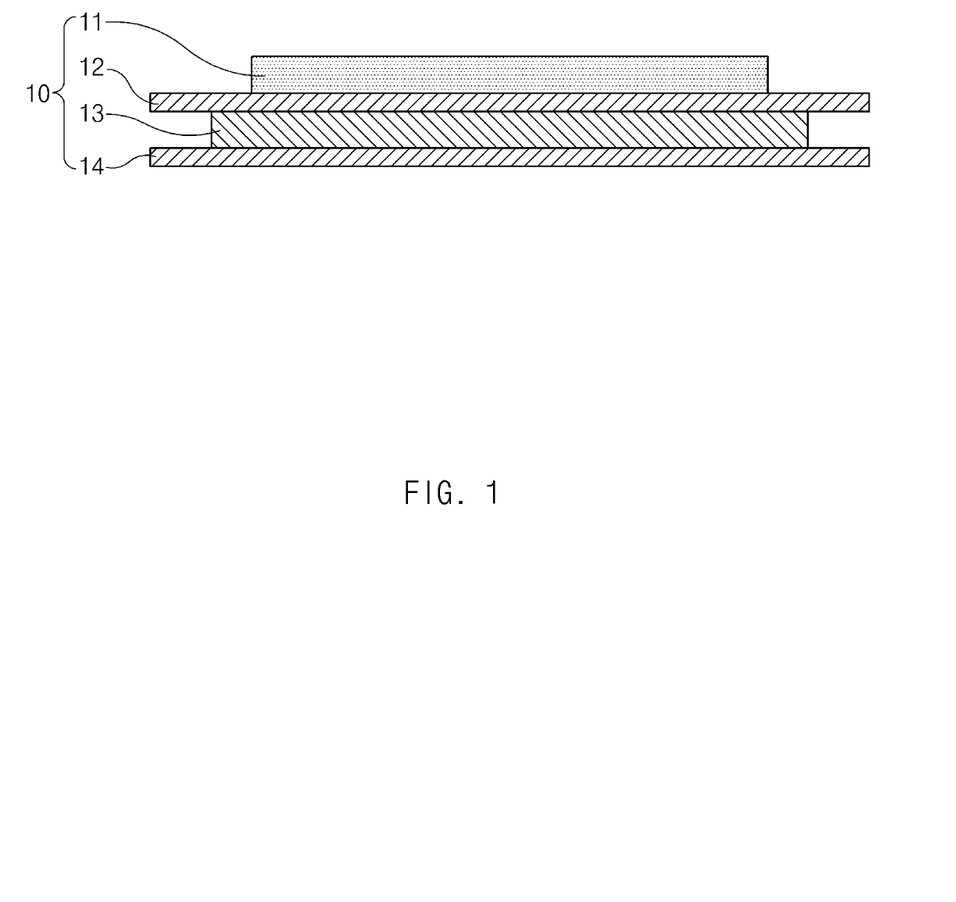
FIG. 1 is a cross-sectional view of a radical unit according to a first embodiment of the present invention.

In a radical unit according to the first embodiment of the present invention, an electrode and a separator are alternately disposed. Here, the electrode and the separator may be arranged in a same number or in a different numbers. For example, as illustrated in FIG. 1, the radical unit 10 may be formed by successively laminating two electrodes 11 and 13 and two separators 12 and 14. Here, the two electrodes may be a positive electrode and a negative electrode, and the positive electrode and the negative electrode may face each other across the separator. Thus, the radical unit 10 has a structure in which the positive electrode, the separator, the negative electrode, and the separator are laminated.

Structure of Electrode Assembly

The electrode assembly according to the first embodiment of the present invention may be formed by repeatedly laminating one kind of radical units or two or more kinds of radical units in a predetermined order.

Figure 2:
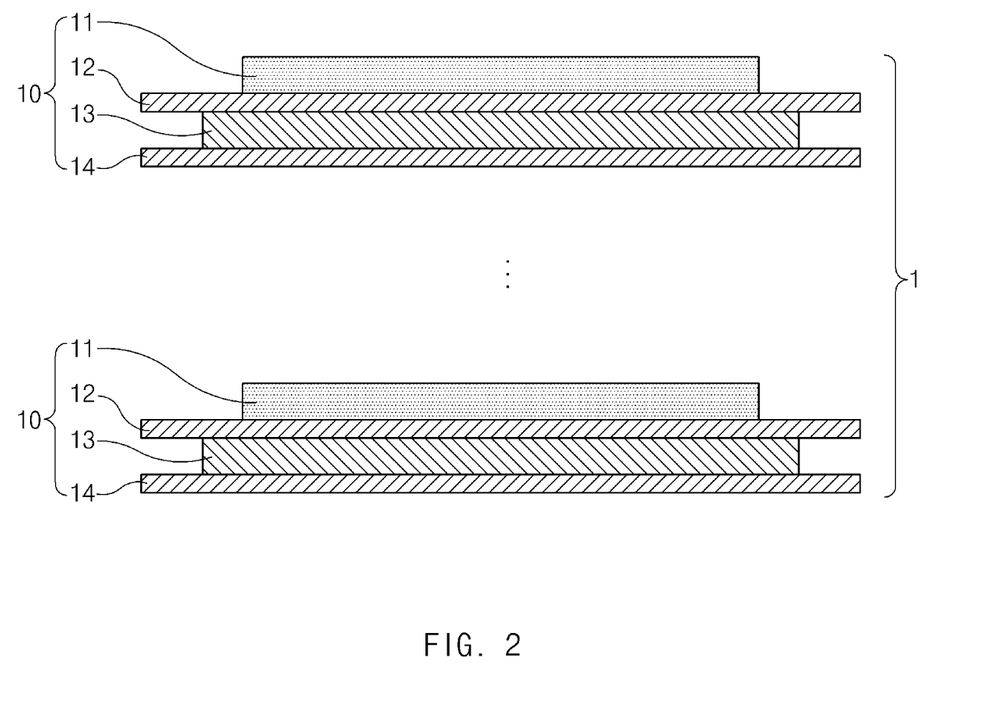
FIG. 2 is a cross-sectional view of an electrode assembly according to the first embodiment of the present invention.

For example, as illustrated in FIG. 2, the electrode assembly 1 may be formed by vertically laminating a plurality of radical units 10 having the same lamination structure. In other words, the electrode assembly 1 according to the first embodiment of the present invention may have a structure in which the radical unit 10 having a four-layered structure, in which the first electrode 11 that is the positive electrode, the separator 12, the second electrode 13 that is the negative electrode, and the separator 14 are successively disposed, is repeatedly laminated.

The radical unit 10 may be manufactured by a lamination system. Here, the radical unit 10 may be improved in bonding property, electrolyte impregnation property, and gas discharging property due to the lamination system 20.

Lamination System

Figure 3:
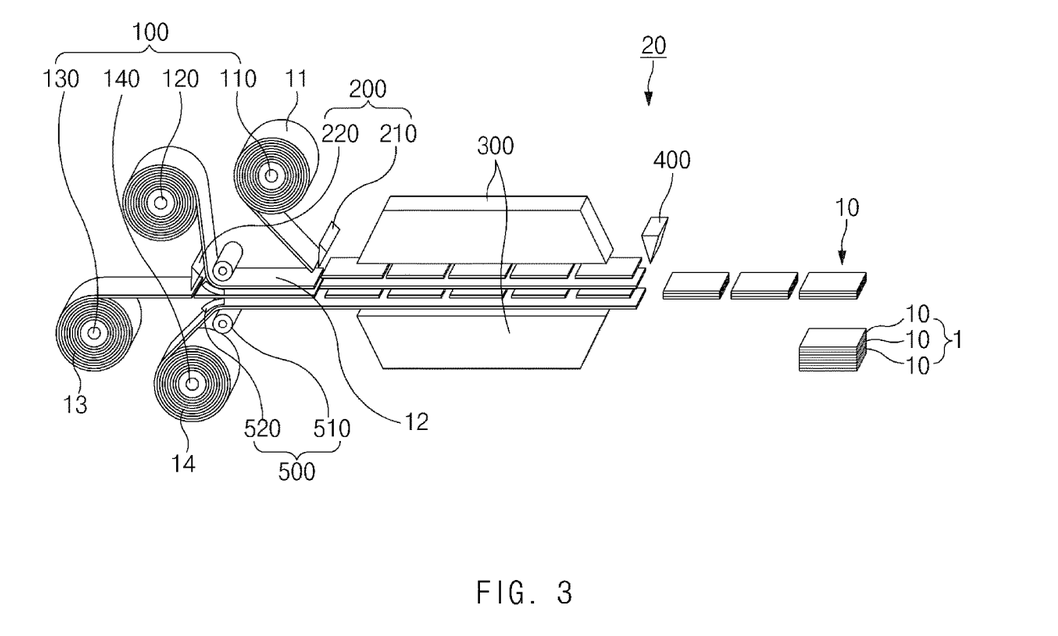
FIG. 3 is a view of a lamination system according to the first embodiment of the present invention.

As illustrated in FIG. 3, the lamination system 20 according to the first embodiment of the present invention may comprise a plurality of supply rollers 100 that supplies the electrodes 11 and 13 and the separators 12 and 14 to be alternately laminated, a first cutter 200 that cuts the electrodes 11 and 13, a laminator 300 that thermally fuses the electrodes 11 and 13 and the separator 12 and 14 to manufacture a radical unit sheet, and a second cutter 400 that cuts the radical unit sheet by a predetermined size to manufacture a radical unit 10.

The plurality of supply rollers 100 comprises a first electrode supply roller 110 that supplies the first electrode that is the positive electrode, a second electrode supply roller 130 that supplies the second electrode that is the negative electrode, a first separator supply roller 120 that supplies one separator 12, and a second separator supply roller 140 that supplies another separator 14.

The first cutter 200 comprises a first cutter member 210 that cuts one electrode 11 by a predetermined size and a second cutter member 220 that cuts another electrode 13 by a predetermined size.

The laminator 300 applies heat to allow the electrodes 11 and 13 to adhere to the separators 12 and 14 while pressing the electrodes 11 and 13 and the separator 12 and 14.

The second cutter 400 cuts the separators 12 and 14 between the electrodes 11 and 13 that correspond to each other to manufacture the radical unit 10.

The lamination system 20 comprising the above-described constituents according to the first embodiment of the present invention may manufacture the radical unit 10 in which the electrodes 11 and 13 and the separators 12 and 14 are alternately laminated. The plurality of radical units 10 may be laminated to manufacture an electrode assembly 1.

The lamination system 20 according to the first embodiment of the present invention may comprise a plasma generating apparatus 500 for improving a bonding property, an electrolyte impregnation property, and a gas discharging property of the radical unit 10.

Figure 4:
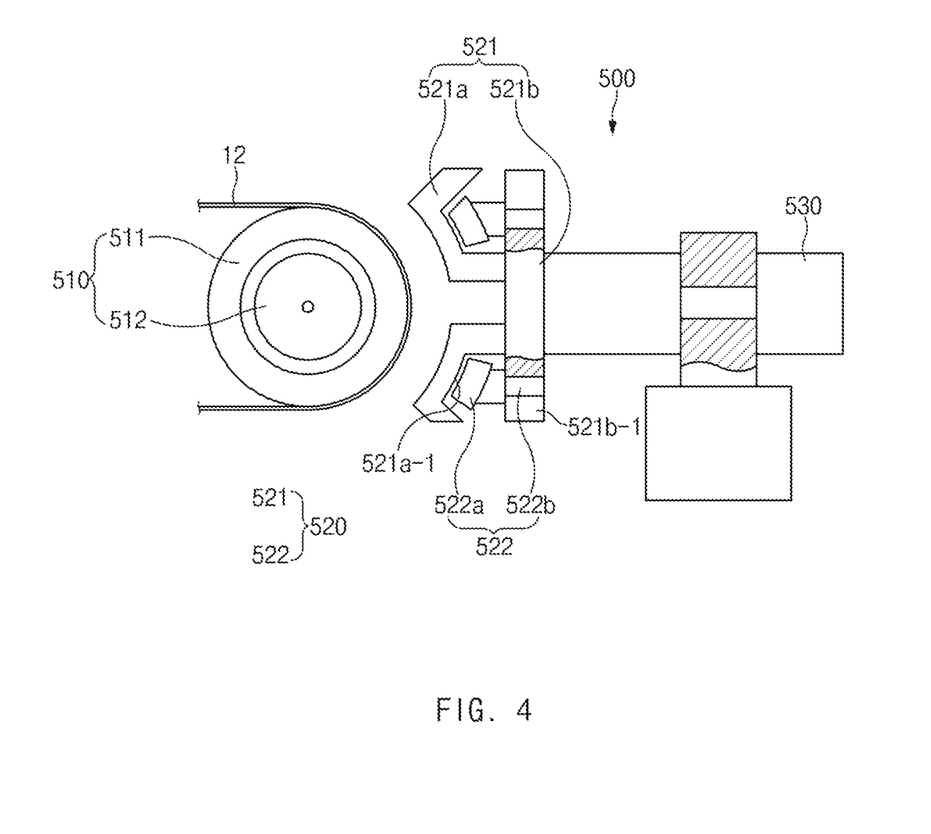
FIG. 4 is a view of a plasma generating apparatus according to the first embodiment of the present invention.
Figure 7:
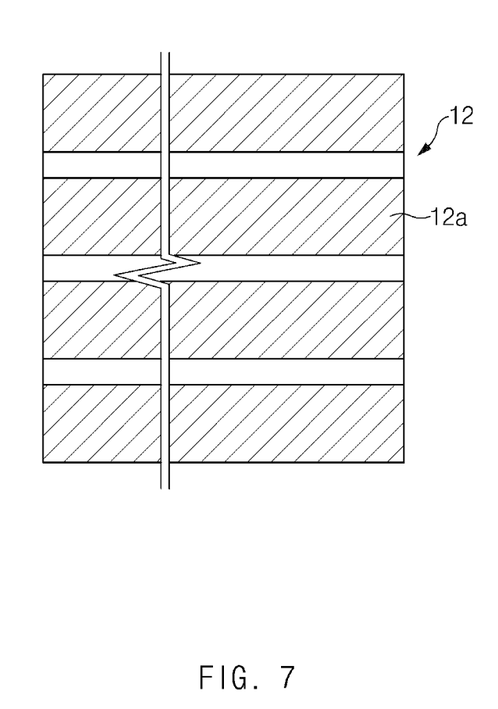
FIG. 7 is a view of a separator on which a patterned bonding layer is formed according to the first embodiment of the present invention.

Plasma Generating Apparatus According to a First Embodiment of the Present Invention As illustrated in FIGS. 4 and 7, the plasma generating apparatus 500 according to the first embodiment of the present invention may form a patterned bonding layer 12a on a surface of each of the separators 12 and 14 before the electrodes 11 and 13 and the separators 12 and 14 are bonded to each other to improve a bonding property, an electrolyte impregnation property, and a gas discharging property.

For example, as illustrated in FIG. 4, the plasma generating apparatus 500 comprises a roller part 510 and a plasma generating part 520, which are respectively provided on a first separator 12 between a first separator supply roller 120 and a laminator 300 and a second separator 14 between a second separator supply roller 140 and the laminator 300.

The roller part 510 comprises a transfer roller 511 that supports one surface of each of the first separators 12 and 14 and transfers the separators 12 and 14 and a metal member 512 built within the transfer roller 511.

Here, although the separators are denoted by reference numerals 12 and 14, in the following description, the reference numerals are unified to reference numeral 12 for more clear description.

As illustrated in FIGS. 4 and 7, the plasma generating part 520 comprises a main body 521 spaced apart from the transfer roller 511 and a plurality of electrode members 522 partially generating plasma between the metal member 512 and the main body 521 to form a patterned bonding layer 12a on the surface of the separator 12.

The plasma generating apparatus 500 comprising the above-described constituents according to the first embodiment of the present invention may partially generate the plasma between the main body 521 and the plasma generating part 520 through interaction between the metal member 512 built within the roller part 510 and the plurality of electrode members 522 of the plasma generating part 520. Thus, the patterned bonding layer 12a may be formed on the surface of the separator 12 transferred by the transfer roller 511.

Here, in the plasma generating part 520 according to the first embodiment of the present invention, the plurality of electrode members 522 may be detachably coupled to the main body 521 to adjust the number of electrode members 522 coupled to the main body 521 based on a size of the separator 12. Thus, the plasma generating apparatus 520 may be compatibly used for the separators having various sizes.

Figure 5:
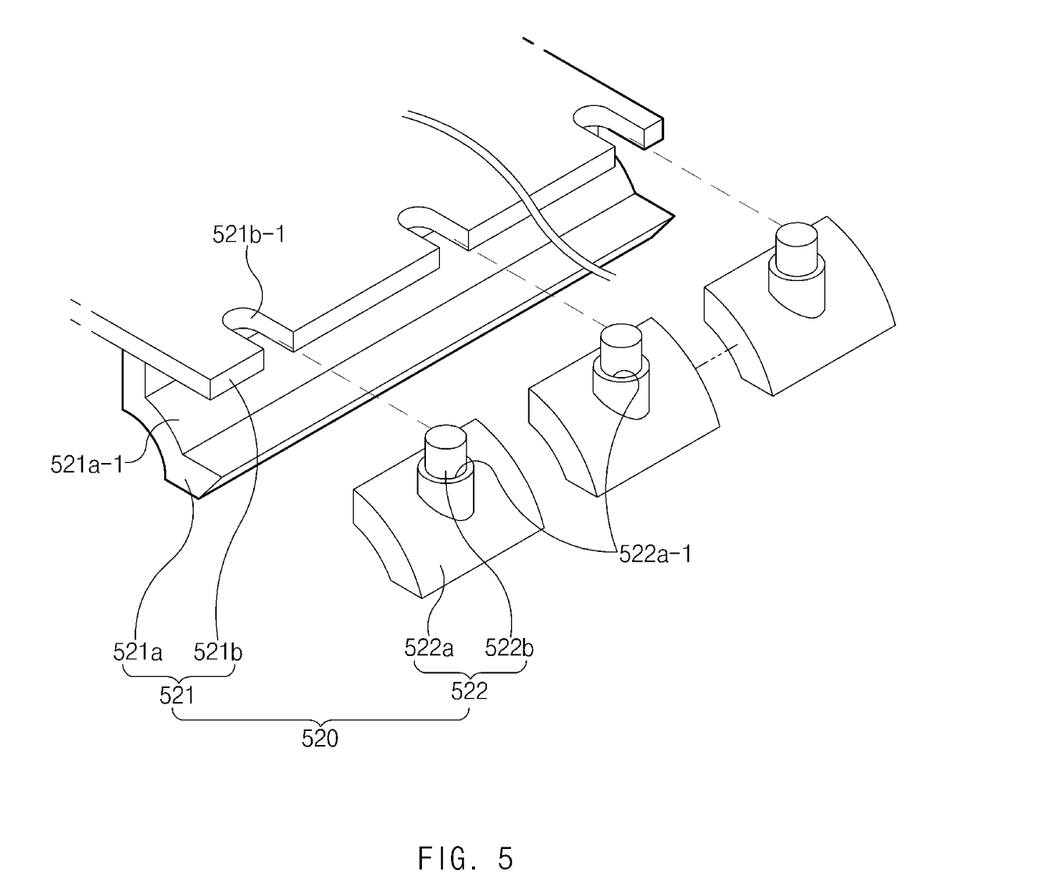
FIG. 5 is a perspective view of a plasma generating part according to the first embodiment of the present invention.
Figure 6:
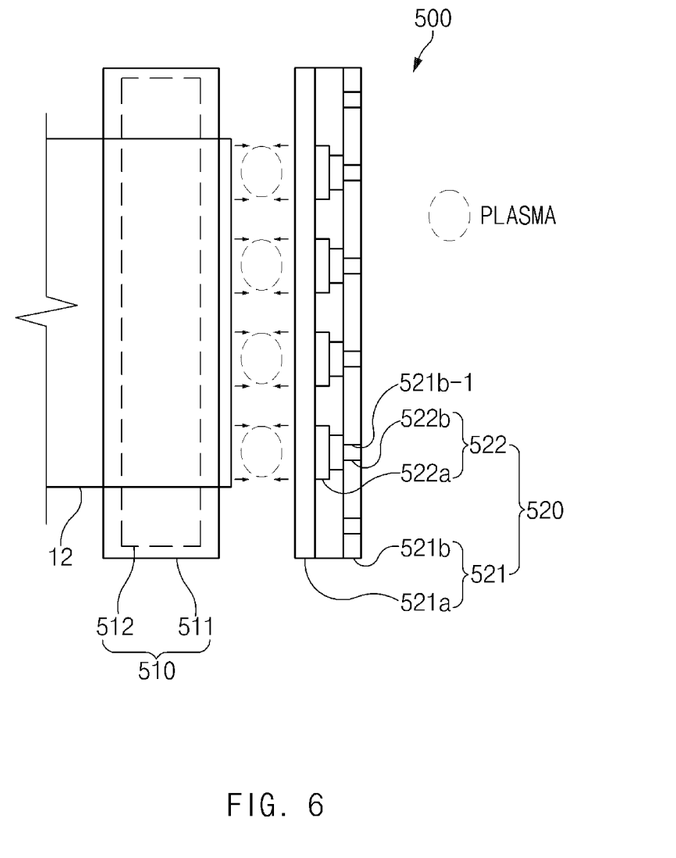
FIG. 6 is a plan view of the plasma generating part according to the first embodiment of the present invention.

For example, as illustrated in FIGS. 5 and 6, the plasma generating part 520 according to the first embodiment of the present invention comprises the main body 521 and the plurality of electrode members 522 that are detachably coupled to the main body 521.

The main body 521 is configured to fix the plurality of electrode members 522. The main body 521 comprises a fixed piece 521a spaced apart from the transfer roller 511 and formed lengthwise in a direction of both ends of the transfer roller 511 and a support piece 521b disposed on a rear surface (a right surface of the fixed piece when viewed in FIG. 4) of the fixed piece 521a to fix the fixed piece 521a.

The support piece 521b may have a same length as the fixed piece 521a to improve the fixation of the fixed piece. Further, a plurality of coupling holes 521b-1 may be formed in positions of a side surface of the support piece 521b, which are spaced apart from each other along the direction of the both ends, to detachably couple the plurality of electrode members 522. As illustrated in FIG. 5, the coupling holes 521*b*-1 may have a "U" shape that is opened in a direction of the side surface of the support piece 521*b*. Thus, the electrode member 522 may be detachable in a direction of a side surface of the coupling hole 521*b*-1 and thereby to improve convenience.

A hook protrusion for preventing the electrode member 522 from being separated may be disposed on an outlet of the coupling hole 521*b*-1 having the "U" shape. Thus, the hook protrusion may prevent the electrode member 522 from being unintentionally separated from the coupling hole 521*b*-1.

The plurality of electrode members 522 comprise an electrode piece 522*a* supported by the fixed piece 521*a* and a coupling protrusion 522*b* that detachably couples the electrode piece 522*a* to the plurality of coupling holes 521*b*-1.

In the plasma generating part 520 comprising the above-described constituents according to the first embodiment of the present invention, when the coupling protrusion 522*a* is coupled to the coupling hole 521*b*-1, the electrode piece 522*a* may be supportedly fixed to the fixed piece 521. When the coupling protrusion 522*a* is separated from the coupling hole 521*b*-1, the electrode piece 522*a* may be separated from the fixed piece 521. In other words, the plurality of electrode members 522 may be detachably coupled to the main body 521.

In more detail, since the electrode member 522 on which the coupling protrusion is formed is coupled to the plurality of coupling holes 521*b*-1 formed in the main body 521 which corresponds to the surface of the separator 12, the plasma generating part 520 having a size that corresponds to a size of the separator 12 may be implemented. Thus, the plasma generating apparatus may be used regardless of the size of the separator 12 to improve compatibility.

In addition, since the electrode member 522 on which the coupling protrusion 522*a* is formed is coupled to only a portion of the plurality of coupling holes 521*b*-1 formed in the main body 521 that corresponds to the surface of the separator 12, a bonding layer 12*a*, which has a pattern having a new shape, may be easily implemented on the surface of the separator 12.

Thus, the plasma generating part 520 according to the first embodiment may be compatibly used for the separators 12 having various sizes since the plurality of electrode members 522 are easily attached to and detached from the main body 521 through the coupling protrusion 522*b* and the coupling hole 521*b*-1.

The coupling protrusion 522*b* may have one of a cylindrical shape, a rectangular shape, and an oval shape as long as the coupling protrusion 522*b* is easily coupled to the coupling hole 521*b*-1.

The fixed piece 521*a* has a support groove 521*a*-1 for stably supporting the electrode member 522 while the electrode member 522 is inserted into a rear surface that faces the support piece 521*b*. Here, the support groove 521*a*-1 may be formed to pass in a direction of the both ends of the fixed piece 521*a*. In other words, the electrode piece 522*a* may be inserted into and supported by the support groove 521*a*-1 of the fixed piece 521*a* to be stably fixed.

The main body 521 may be made of a nonmetallic material. Thus, an occurrence of resistance between the metal member 512 and electrode member 522 may be prevented to stably generate the plasma between the metal member 512 and main body 521.

The main body 521 may be made of a ceramic among the non-metallic material. Ceramic is a nonmetallic inorganic material obtained through a thermal treatment process and has heat resistance, high strength, and corrosion resistance. Particularly, since the ceramic is lightweight, efficiency of use may be improved.

The electrode pieces 522*a* of the plurality of electrode members 522 may be corona discharge electrodes. The plasma may be stably generated between the metal member 512 and the main body 521 due to the corona discharge electrodes.

The plurality of electrode members 522 may be provided at a same interval or different intervals in a width direction of the separator 12. Thus, the separator 12 and the electrode 11 may be implemented with a uniform bonding force, and a portion of the separator 12 and the electrode 11 may have a strong bonding force, and a remaining portion may have a weak bonding force.

The plurality of electrode members 522 may have the same length, width, and thickness, or one or more of lengths, widths, and thicknesses of the plurality of electrode members 522 may be different from each other. Thus, a bonding layer 12*a* having various patterns may be formed on the surface of the separator 12.

In the electrode member 522, the electrode piece 522*a* and the coupling protrusion 522*b* may be separably formed. Thus, when the electrode piece 522*a* and the coupling protrusion 522*b* are damaged, only the damaged electrode piece 522*a* or coupling protrusion 522*b* may be replaced to be reused.

For example, the electrode piece 522*a* may have a coupling groove 522*a*-1, and an end of the coupling protrusion 522*b* may be coupled to the coupling groove 522*a*-1 to manufacture the electrode member 522. Thereafter, when the one end of the coupling protrusion 522*b* is removed from the coupling groove 522*a*-1, the electrode piece 522*a* and the coupling protrusion 522*b* may be easily separated from each other.

Particularly, as the electrode piece 522*a* and the coupling protrusion 522*b* are separated from each other, the electrode pieces 522*a* having various sizes and shapes may be selectively coupled to the coupling protrusion 522*b* to manufacture the electrode member 522. Thus, the patterned bonding layer 12*a* having various shapes and areas may be implemented on the surface of the separator 12.

The plasma generating apparatus 500 according to the first embodiment of the present invention may further comprise a moving part 530 that moves the plasma generating part 520 in a direction of the transfer roller 511 or in an opposite direction thereof. The moving part 530 may be provided as a hydraulic or pneumatic cylinder.

In particular, the moving part 530 may move the plasma generating part 520 to adjust a distance between the plasma generating part 520 and the transfer roller 511 so that plasma is more stably generated.

The plasma generating apparatus 500 according to the first embodiment of the present invention may form the bonding layer 12*a* having the patterned bonding force on each of both surfaces of the separator 12. Thus, the electrode bonded to the both surfaces of the separator 12 may be improved in bonding, electrolyte impregnation, and gas discharging properties.

The plasma generating apparatus 500 according to the first embodiment of the present invention may form bonding layers having different bonding forces on both surfaces of the separator 12. Thus, the electrodes bonded to the both surfaces of the separator 12 may be adjusted to have different bonding forces. If necessary, the electrodes may be adjusted to have the same bonding force.

Thus, the lamination system 20 according to the first embodiment of the present invention may comprise the plasma generating apparatus 500 to obtain the separator having the patterned bonding layer as illustrated in FIG. 7.

Hereinafter, in descriptions of another embodiment of the present invention, constituents having the same constituent and function as the above-mentioned embodiment have been given the same reference numeral in the drawings, and thus duplicated description will be omitted.

Second Embodiment of the Present Invention

Figure 8:
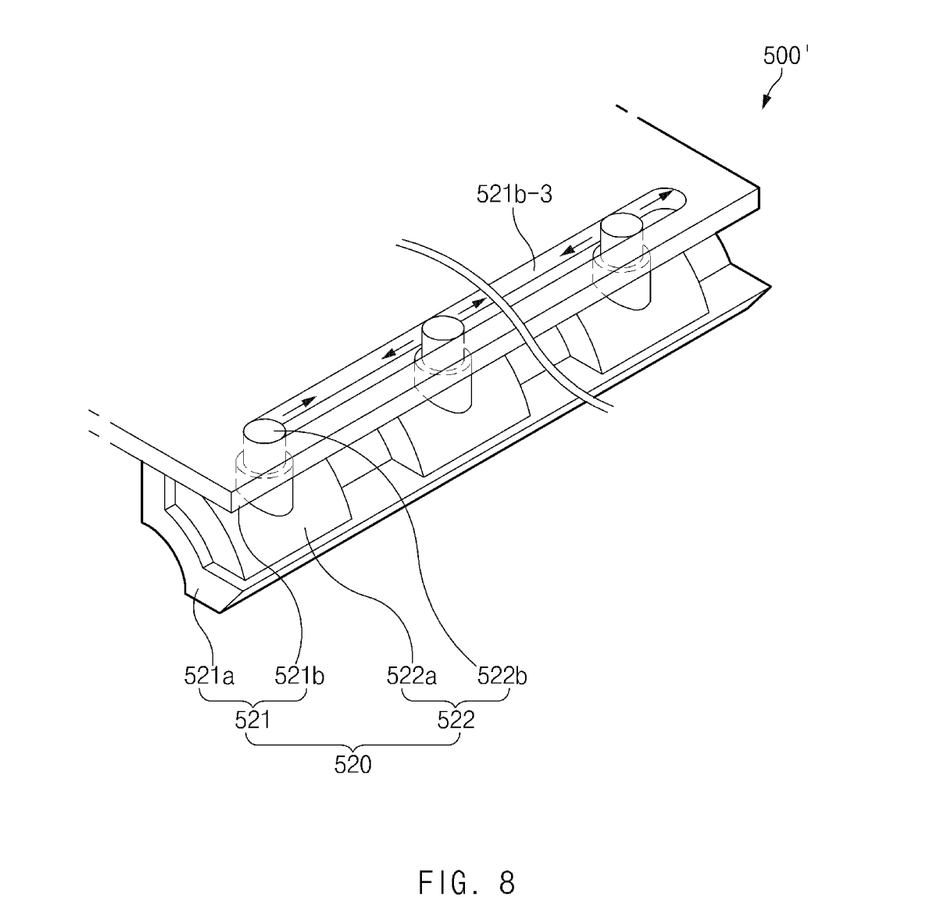
FIG. 8 is a perspective view of a plasma generating part according to a second embodiment of the present invention.

As illustrated in FIG. 8, a plasma generating apparatus 500' according to a second embodiment of the present invention may comprise a plasma generating part 520. The plasma generating part 520 comprises a main body 521 disposed in a width direction of the separator 12 and a plurality of electrode members 522 that partially generate plasma between a metal member 512 and the main body 521 to form a patterned bonding layer 12a on a surface of the separator 12.

The main body 521 comprises a fixed piece 521a spaced apart from the transfer roller 511 and a support piece 521b to which the fixed piece 521a is fixed and which has a coupling hole 521b-3 that is formed lengthwise in a direction of both ends of the main body 521.

Each of the plurality of electrode members 522 comprises an electrode piece 522a supported by the fixed piece 521a and a coupling protrusion 522b that detachably couples the electrode piece 522a to the coupling hole 521b-3 and also moves the electrode piece 522a within the coupling hole 521b-3 in the direction of the both ends of the main body 521.

In the plasma generating apparatus 500 comprising the above-described constituents according to the second embodiment of the present invention, the coupling protrusion 522b may be detachably coupled to the coupling hole 521b-3 and also moved within the coupling hole 521b-3 in the direction of the both ends of the main body 521. Thus, the plurality of electrode members 522 coupled to the coupling hole 521b-3 may be adjusted to match the size of the separator 12. Therefore, the plasma generating apparatus 500 may be compatibly used for the separators having various sizes.

The coupling protrusion 522b may have the other end that is coupled to a nut after passing through the coupling hole 521b-3. Thus, the fixation of the plurality of electrode members 522 coupled to the main body 521 may be improved.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A plasma generating apparatus for a secondary battery, the apparatus comprising:
    a roller part comprising a transfer roller that transfers a separator and a metal member built in the transfer roller and rotating about an axis extending in an axial direction; and
    a plasma generating part comprising a main body spaced apart from the transfer roller and a plurality of electrode members disposed on positions that are spaced apart from each other in the axial direction and partially generating a plasma between the metal member and the main body to form a patterned bonding layer on a surface of the separator,
    wherein the plurality of electrode members are detachably coupled to the main body to adjust a number of the plurality of electrode members coupled to the main body based on a size of the separator,
    wherein the main body comprises a fixed piece spaced apart from the transfer roller and a support piece to which the fixed piece is fixed and which has a plurality of coupling holes in positions that are spaced apart from each other in the axial direction, and
    wherein each of the plurality of electrode members comprises an electrode piece supported by the fixed piece and a coupling protrusion that detachably couples the electrode piece to the coupling hole.

2. A plasma generating apparatus for a secondary batter, the apparatus comprising:
    a roller part comprising a transfer roller that transfers a separator and a metal member built in the transfer roller and rotating about an axis extending in an axial direction; and
    a plasma generating part comprising a main body spaced apart from the transfer roller and a plurality of electrode members disposed on positions that are spaced apart from each other in the axial direction and partially generating a plasma between the metal member and the main body to form a patterned bonding layer on a surface of the separator,
    wherein the plurality of electrode members are detachably coupled to the main body to adjust a number of the plurality of electrode members coupled to the main body based on a size of the separator,
    wherein the main body comprises a fixed piece spaced apart from the transfer roller and a support piece to which the fixed piece is fixed and which has a coupling hole that is formed lengthwise in the axial direction, and
    wherein each of the plurality of electrode members comprises an electrode piece supported by the fixed piece and a coupling protrusion that detachably couples the electrode piece to the coupling hole and simultaneously allows the electrode piece to be moved within the coupling hole in the axial direction.

3. The plasma generating apparatus of claim 1, wherein the plurality of electrode members are disposed at a same interval or different intervals in a width direction of the separator on the main body.

4. The plasma generating apparatus of claim 1, wherein the plurality of electrode members have same length, width, and thickness.

5. The plasma generating apparatus of claim 1, wherein one or more of lengths, widths, and thicknesses of the plurality of electrode members are different from each other.

6. The plasma generating apparatus of claim 1, further comprising a moving part that moves the plasma generating part in a direction that is directed toward the transfer roller or in a direction opposite to the direction that is directed toward the transfer roller.

7. The plasma generating apparatus of claim 1, wherein the main body is made of a nonmetallic material.

8. The plasma generating apparatus of claim 1, wherein the main body is made of a ceramic.

9. The plasma generating apparatus of claim 1, wherein the plurality of electrode members are provided as corona discharge electrodes.

10. The plasma generating apparatus of claim 1, wherein the plasma generating part is disposed on each of opposite surfaces of the separator to form a patterned bonding layer on each of the opposite surfaces of the separator.

11. The plasma generating apparatus of claim 9, wherein the plasma generating part forms patterned bonding layers having different bonding forces on the opposite surfaces of the separator.

12. A lamination system for a secondary battery, the system comprising:
   a plurality of supply rollers that supplies an electrode and a separator so that the electrode and the separator are alternately laminated;
   a first cutter that cuts the electrode;
   the plasma generating apparatus of claim 1 and forms a patterned bonding layer on a surface of the separator;
   a laminator that thermally fuses the electrode and the separator to manufacture a radical unit; and
   a second cutter that cuts the radical unit to a uniform size,
   wherein the plasma generating apparatus partially generates a plasma on the surface of the separator before the separator and the electrode are thermally fused to form the patterned bonding layer.

13. A lamination system for a secondary battery, the system comprising:
   a plurality of supply rollers that supplies an electrode and a separator so that the electrode and the separator are alternately laminated;
   a first cutter that cuts the electrode;
   the plasma generating apparatus of claim 2 and forms a patterned bonding layer on a surface of the separator;
   a laminator that thermally fuses the electrode and the separator to manufacture a radical unit; and
   a second cutter that cuts the radical unit to a uniform size,
   wherein the plasma generating apparatus partially generates a plasma on the surface of the separator before the separator and the electrode are thermally fused to form the patterned bonding layer.

* * * * *